(12) United States Patent
Bendel

(10) Patent No.: US 9,759,184 B2
(45) Date of Patent: Sep. 12, 2017

(54) BULKHEAD OF A WIND TURBINE

(75) Inventor: Urs Bendel, Fockbek (DE)

(73) Assignee: Senvion SE, Hamburg (DE)

( * ) Notice: Subject to any disclaimer, the term of this patent is extended or adjusted under 35 U.S.C. 154(b) by 727 days.

(21) Appl. No.: 13/821,663

(22) PCT Filed: Oct. 10, 2011

(86) PCT No.: PCT/EP2011/005043
§ 371 (c)(1),
(2), (4) Date: Mar. 8, 2013

(87) PCT Pub. No.: WO2012/048835
PCT Pub. Date: Apr. 19, 2012

(65) Prior Publication Data
US 2013/0164144 A1    Jun. 27, 2013

(30) Foreign Application Priority Data

Oct. 15, 2010   (DE) .......................... 10 2010 042 530

(51) Int. Cl.
| | |
|---|---|
| *F03D 1/00* | (2006.01) |
| *F03D 1/06* | (2006.01) |
| *F03D 80/00* | (2016.01) |
| *F03D 80/50* | (2016.01) |

(52) U.S. Cl.
CPC ........... *F03D 1/0675* (2013.01); *F03D 1/001* (2013.01); *F03D 1/0683* (2013.01);
(Continued)

(58) Field of Classification Search
CPC ...... F03D 1/003; F03D 1/0675; F03D 1/0691; F03D 11/00; F05B 2230/80;
(Continued)

(56) References Cited

U.S. PATENT DOCUMENTS

| | | | |
|---|---|---|---|
| 2,008,234 A | * | 7/1935 | Weeks .................... F03D 1/065 29/889.2 |
| 5,959,265 A | * | 9/1999 | Van Ligten .......... G10K 11/172 181/286 |

(Continued)

FOREIGN PATENT DOCUMENTS

| | | |
|---|---|---|
| DE | 68917625 | 1/1995 |
| DE | 202004003521 | 6/2004 |
| DE | 102006055091 | 5/2008 |

OTHER PUBLICATIONS

Konstruieren mit Faser-Kunststoff-Verbunden, Springer-Verlag, Berlin Heidelberg 2005.

*Primary Examiner* — Mark Laurenzi
*Assistant Examiner* — Brandon Lee
(74) *Attorney, Agent, or Firm* — Rankin, Hill & Clark LLP

(57) ABSTRACT

A bulkhead (22) of a wind turbine (10) to be arranged on a rotor blade connection of a rotor blade (14), especially on a rotor hub (9). The bulkhead (22) has a core body (30). A layer (31, 32) of fiberglass-reinforced plastic (31, 32) is arranged on the core body (30) on both sides respectively and a metal layer body (33) is arranged on one side of the layer of fiberglass-reinforced plastic (31). A method for producing a bulkhead (22) of a wind turbine (9), which is arranged on a rotor blade connection of a rotor blade (14) and a use of a bulkhead (22) of a wind turbine (10).

9 Claims, 3 Drawing Sheets

(52) U.S. Cl.
CPC ........... *F03D 1/0691* (2013.01); *F03D 80/00* (2016.05); *F03D 80/50* (2016.05); *F05B 2230/80* (2013.01); *F05B 2280/102* (2013.01); *F05B 2280/1021* (2013.01); *F05B 2280/4002* (2013.01); *F05B 2280/4007* (2013.01); *F05B 2280/6003* (2013.01); *Y02E 10/721* (2013.01); *Y02P 70/523* (2015.11); *Y10T 29/49336* (2015.01); *Y10T 29/49826* (2015.01)

(58) Field of Classification Search
CPC ........ F05B 2280/102; F05B 2280/1021; F05B 2280/4002; F05B 2280/4007; F05B 2280/6003; Y02E 10/721; Y02E 10/722; Y10T 29/49336; Y10T 29/49826
See application file for complete search history.

(56) References Cited

U.S. PATENT DOCUMENTS

| | | | | |
|---|---|---|---|---|
| 8,096,759 | B2* | 1/2012 | Bendel | F03D 1/003 415/201 |
| 2001/0047958 | A1* | 12/2001 | Estep | B01D 29/15 210/433.1 |
| 2003/0134085 | A1* | 7/2003 | Haas | B32B 5/22 428/116 |
| 2005/0215698 | A1 | 9/2005 | Raghavendran et al. | |
| 2006/0225278 | A1* | 10/2006 | Lin | F03D 1/001 29/889.72 |
| 2007/0081900 | A1* | 4/2007 | Nies | F03D 1/065 416/224 |
| 2007/0104584 | A1 | 5/2007 | Cairo | |
| 2007/0251090 | A1* | 11/2007 | Breugel | B29C 70/30 29/889.7 |
| 2008/0118365 | A1* | 5/2008 | Bendel | F03D 1/003 416/244 R |
| 2010/0008789 | A1* | 1/2010 | Jensen | F03D 1/0675 416/233 |
| 2010/0135816 | A1 | 6/2010 | Cairo | |
| 2011/0221093 | A1* | 9/2011 | Perrow | B29C 70/44 264/255 |

* cited by examiner

BULKHEAD OF A WIND TURBINE

BACKGROUND OF THE INVENTION

Field of the Invention

The invention relates to a bulkhead of a wind turbine to be arranged on a rotor blade connection of a rotor blade, especially on a rotor hub. Furthermore, the invention relates to a method for producing a bulkhead of a wind turbine, which is arrangeable or will be or is arranged on a rotor blade connection of a rotor blade.

Moreover, the invention relates to a use of a bulkhead of a wind turbine.

Wind turbines are known in the prior art. Wind turbines have at least one rotor blade, which is arranged on a rotor hub. For safety reasons, a bulkhead is provided in the blade root of the rotor blade, so that appropriately positioned personnel can stand on the bulkhead and perform maintenance work in the rotor hub or in the rotor blade.

In order to get to the rotor blade from the rotor hub, the bulkhead generally has a hatch or respectively an access hatch in the middle of the bulkhead.

Description of Related Art

DE 20 2004 003 521 U1 describes a rotor hub that is walkable on the inside, which has a reinforcing bulkhead arranged in the area of its ring flange. This reinforcing bulkhead has an access opening for maintenance personnel in the middle.

Furthermore, a bulkhead of a wind turbine is disclosed in DE 10 2006 055 091 A1, which is arrangeable on a rotor blade connection of a rotor blade.

BRIEF SUMMARY OF THE INVENTION

Based on this prior art, the object of the present invention is to further develop a bulkhead of a wind turbine so that the bulkhead is also easy to handle in the case of rotor blades with a larger blade connection diameter.

The object is solved by a bulkhead of a wind turbine for the arrangement on a rotor blade connection of a rotor blade, especially a rotor blade on a rotor hub, wherein the bulkhead has a core body, a layer of fiberglass-reinforced plastic (FGRP) is arranged on both sides on the core body respectively and wherein a metal layer body is arranged on one side the layer of fiberglass-reinforced plastic (FGRP).

Through the further embodiment of the bulkhead, a bulkhead of a wind turbine is provided, which will be or is arranged in or on the blade root of a rotor blade, i.e. on the rotor blade connection, or in the area between the blade root of a rotor blade and a rotor hub using corresponding fastening means. Thus, a bulkhead for the arrangement in the blade root of a rotor blade or for the arrangement in the area between the blade root of the rotor blade and of the rotor hub is provided.

According to the invention, it is provided for the production of the bulkhead that a core body is used, wherein fiberglass-reinforced plastic is applied on both sides of the core body respectively as a laminate layer, for example in the form of mats or the like, and is connected with the core body. Moreover, a thin metal layer in the form of a metal layer body is arranged on one side of the bulkhead and is bonded with the side or respectively the layer of fiberglass-reinforced plastic. A stable and light bulkhead, which is arranged in or on the blade root or on a rotor blade connection of a rotor blade is hereby formed, wherein in particular the metal layer body is arranged or respectively positioned such that the metal layer body points or is oriented towards the inside or respectively towards the inner area of the rotor blade.

As fiberglass-reinforced plastic, glass fibers are embedded for example in duroplastic polymers, such as unsaturated polyester resin or epoxy resin, made available and arranged on the core body.

Moreover, a material, which has a lower specific density than plywood as the core material, is used as the rigid, mechanically stable core body so that, due to the porosity of the core body, a rigid, porous core body is provided, which has a low weight in the case of the same dimensions with respect to a core body e.g. made of plywood. In particular, core bodies made of plastic foams, balsa wood or metal foams are preferred. In particular, the use of plastic foams or metal foams, but also in the case of balsa wood, the core body is thus a foam core body. Balsa wood is very porous and has properties similar to a plastic foam.

In particular, the core body used for the bulkhead has a uniform, (almost) isotropic behaviour in all three spatial directions (X, Y, Z direction), wherein the core body itself has porous, foam-like core structures.

Through the bulkhead design according to the invention, which is not designed within the framework of the invention as a reinforcing bulkhead, a structure component for a rotor blade as well as for a rotor is provided, which is arranged in or on the rotor blade root, wherein according to the invention the bulkhead has a low weight as well as a high stability. Moreover, it is ensured through the formation of a metal layer body on one side of the bulkhead that the erosion by particles inside the rotor blade is reduced or even avoided.

A bulkhead in a multi-layered sandwich construction is hereby provided. The layer made of fiberglass-reinforced plastic is thereby laminated on both sides of the core body.

For this, it is provided in a further embodiment of the bulkhead that the core body is made of a polymer or a light metal foam, in particular aluminum foam, or balsa wood.

Preferably, the core body is made of a dense plastic foam, wherein in particular the core body is made of polyvinyl chloride (PVC) or polyethylene (PET).

Furthermore, the layers of fiberglass-reinforced plastic (FGRP) are made of non-woven fabrics or mats, wherein in particular the fibre alignment of the fibers in the FGRP layers is unidirectional, orthotropic or quasi isotropic.

Further, the bulkhead is characterized in that the bulkhead is provided with one or more access openings for maintenance personnel or respectively for service workers, wherein in particular the access openings are formed in a closable manner. It is possible through the access openings that for large rotor blades the bulkhead can be used as a platform for the inspection or maintenance of a rotor blade. It is hereby provided in particular that the bulkhead has one or more access openings, which are designed in particular to be closable or coverable.

Due to the fact that one or more access openings are provided on the bulkhead, it is for example possible during the production of large rotor hubs or large rotor blades to facilitate the access options and thus the maintenance of these components. Facilitated access to the rotor blades results in particular when several access openings are designed on the outer edge of the bulkhead.

Within the framework of the invention, it is also possible that only one, in particular closable, access opening is designed on the bulkhead. For this, articulated or pivotable flaps or covers are preferably provided on the access openings.

Moreover, one embodiment of the bulkhead is characterized in that the core body has a thickness between 15 mm and 35 mm, in particular between 20 mm and 30 mm and/or the layers of fiberglass-reinforced plastic (FGRP) have a thickness between 1 mm and 5 mm, in particular between 2 mm to 4 mm, respectively and/or the metal layer body has a thickness between 0.1 mm and 0.8 mm, in particular between 0.2 to 0.5 mm. It is hereby possible that the bulkhead according to the invention has a thickness (in diameter) between 17.1 mm to 45.8 mm. A bulkhead is thereby provided, which has a sufficient stability at a diameter between 1.5 m to 3.5 m so that one or more service personnel can safely stand on the bulkhead upon arrangement between a rotor hub and a rotor blade.

Moreover, the bulkhead produced according to the invention is characterized in that it is very light due to its sandwich construction with respect to a bulkhead for example with a core made of plywood and thereby easy to handle in the case of assembly by one or two persons due to the low weight, whereby the assembly of the bulkhead for example with a diameter of 3.0 m is possible in an easy manner, in order to position or respectively arrange this bulkhead in the area of the rotor blade root of the rotor blade.

Furthermore, it is provided in particular that the metal layer body is made of a non-rusting metal, in particular stainless steel, or aluminium.

Furthermore, the bulkhead is characterized in a further embodiment in that the metal layer body is connected with the layer of fibre glass reinforced plastic, in particular in an inseparable manner, by adhesives or screws or rivets.

Moreover, the object is solved by a method for producing a bulkhead of a wind turbine, which is arrangeable or is or will be arranged on a rotor blade connection of a rotor blade, which is further characterized in that a layer of fiberglass-reinforced plastic (FGRP) is applied on a core body on one side, respectively, and a metal layer body is arranged on one side on a layer of fiberglass-reinforced plastic and the metal layer body is connected with the layer made of fiberglass-reinforced plastic, in particular in an inseparable manner.

Furthermore, the method is characterized in that the bulkhead is formed or produced as described above.

Moreover, the object is solved by the use of a bulkhead of a wind turbine for arrangement on a rotor blade connection of a rotor blade, in particular on a rotor blade root of the rotor blade, wherein in particular the metal layer body will be or is arranged towards the inside of the rotor blade. We expressly refer to the above explanations for the design of a bulkhead in order to avoid repetitions.

Further characteristics of the invention will become apparent from the description of the embodiments according to the invention together with the claims and the included drawings. Embodiments according to the invention can fulfil individual characteristics or a combination of several characteristics.

BRIEF DESCRIPTION OF THE DRAWINGS

The invention is described below, without restricting the general intent of the invention, based on exemplary embodiments in reference to the drawings, whereby we expressly refer to the drawings with regard to the disclosure of all details according to the invention that are not explained in greater detail in the text. In the figures.

In the following figures, the same or similar types of elements or respectively corresponding parts are provided with the same reference numbers in order to prevent the item from needing to be reintroduced.

DETAILED DESCRIPTION OF THE INVENTION

Figure 1:
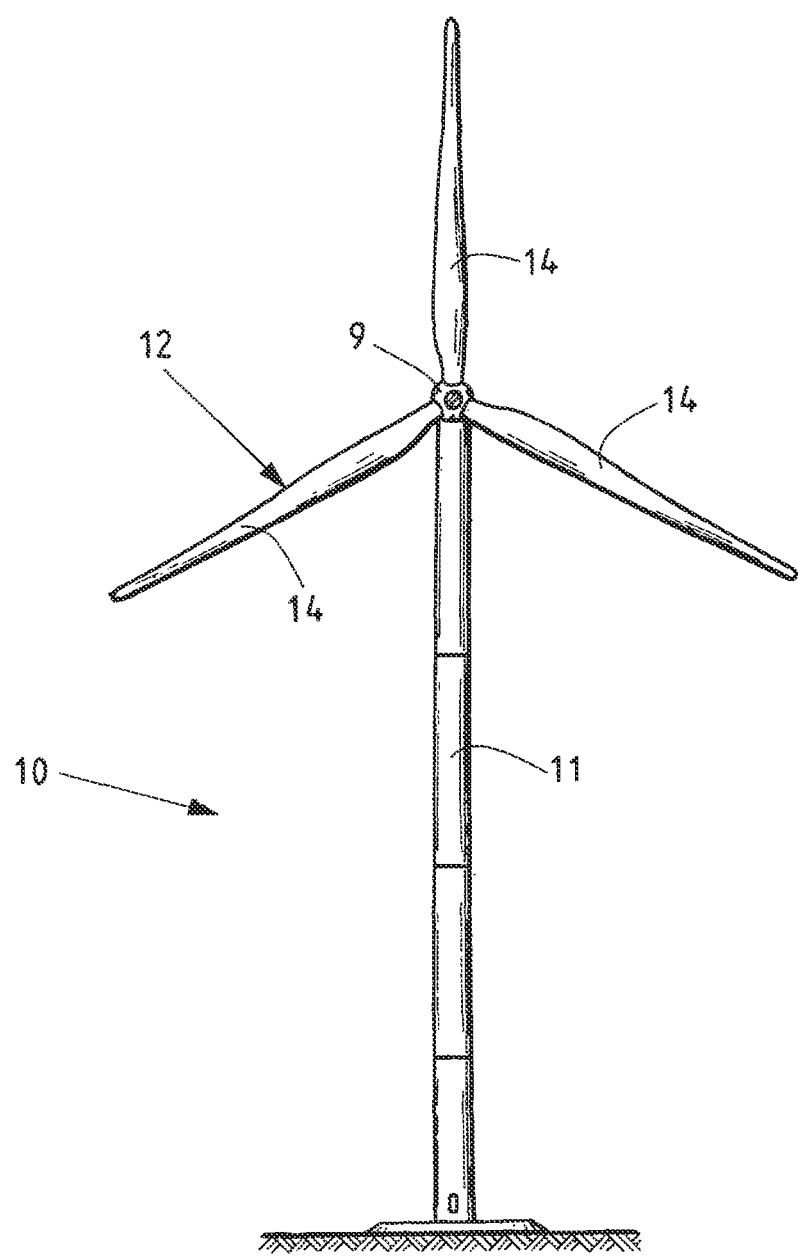
FIG. 1 is an elevation view of a wind turbine.

FIG. 1 shows a schematic representation of a wind turbine 10. The wind turbine 10 has a tower 11 and a rotor 12, which comprises three rotor blades 14, which are attached to a rotor hub. The rotor hub 9 is connected to a rotor shaft. When the wind blows, the rotor 12 turns in the known manner. Power from a generator connected to the rotor 12 or via the rotor hub 9 and the rotor shaft 13 can hereby be created and delivered to a consumer network.

Figure 2:
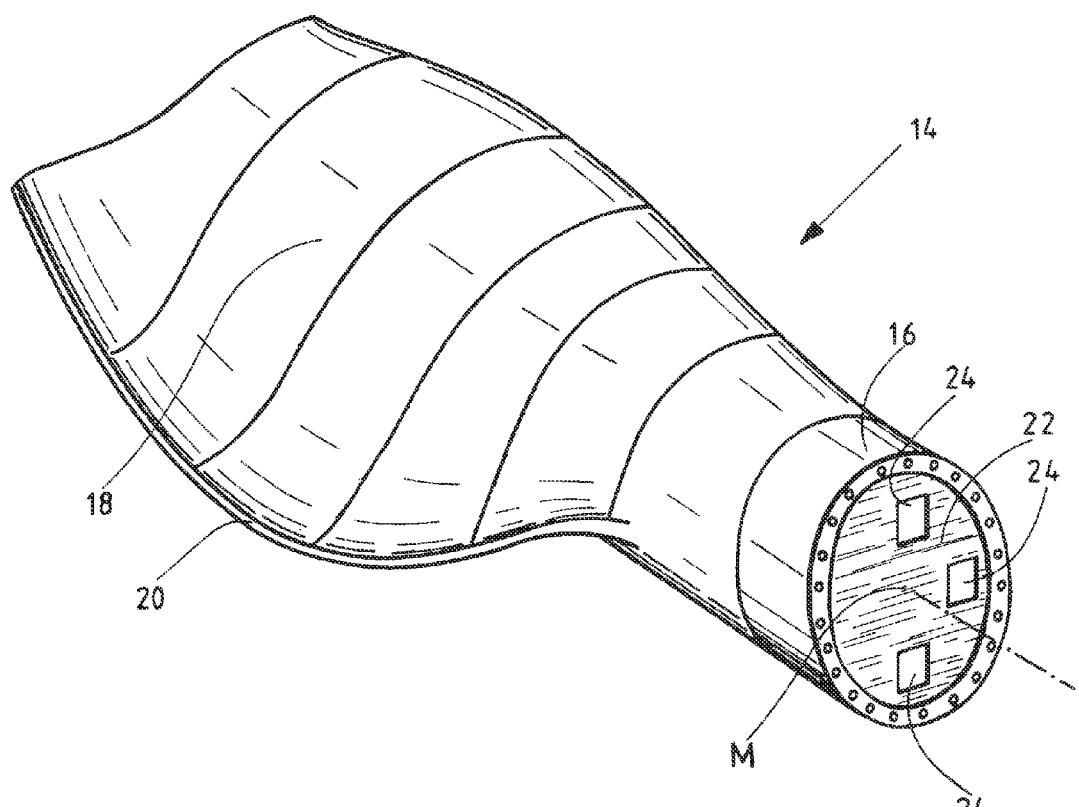
FIG. 2 is a partial perspective view of a rotor blade with a bulkhead according to the invention.

FIG. 2 shows a perspective view of a lower section of the rotor blade 14. The rotor blade 14 has a so-called rotor blade root 16, which has a cross-section with a general circular shape, on the side facing the rotor hub. The rotor blade 14 itself is hollow inside. The rotor blade 14 is designed in a profiled manner between the rotor blade root 16 and the rotor blade peak and has a pressure side 18. The associated suction side is assigned to the pressure side 18 on the opposite-lying side (not shown here).

The corresponding rotor blade profiles along the longitudinal axis of the rotor blade 14 run together on the rear edge 20 of the rotor blade 14. A bulkhead 22 in arranged in the rotor blade 14 in the area of the rotor blade root 16, wherein it is possible in one embodiment to glue the bulkhead 22 into the rotor blade root 16. The bulkhead 22 is permanently mounted on the rotor blade root 16 or inserted into it.

The bulkhead 22 is also designed in a circular manner and has at least one, in this case three, access openings 24, which are arranged outside the centre point M of the bulkhead 22. The access openings 24 are dimensioned such that a person can climb into the interior of the rotor blade 14 after opening a hatch on the access opening 24 of the rotor hub.

Due to the fact that several access openings are designed on the bulkhead 22, a simple and safe entrance and exit on the rotor blades 14 is also ensured in the case of rotor blade roots 16 with large diameters, for example larger than 2 m or 2.5 m or 3.0 m.

The bulkhead 22 prevents a falling in of objects or persons from the rotor hub into the rotor blade 14 and also seals rotor blade 14 from the rotor hub with respect to dirt and/or humidity. At the same time, the bulkhead 22 can be used as a corresponding work platform for maintenance work on the rotor hub or on the rotor blade 14. The access openings 24 are arranged in a spaced manner on the outer circumference of the bulkhead 22, wherein the access openings 24 are arranged in an offset manner at a 90° angle. It is thereby possible to arrange the access openings 24 in a corresponding 12 o'clock, 3 o'clock and 6 o'clock position (or 3 o'clock, 6 o'clock, 9 o'clock position) if the rotor blade 14 is mounted with the front edge, i.e. with the approach side when the rotor blade 14 is arranged horizontally, on the wind turbine for maintenance work. These positions correspond with the arrangements of the access openings in the area of the pressure side, the nose and the suction side.

Moreover, the rotational axis 26 of the rotor blade 14 is indicated with a dashed and dotted line, which in the geometric sense penetrates horizontally the bulkhead 22 at point M.

Figure 3:
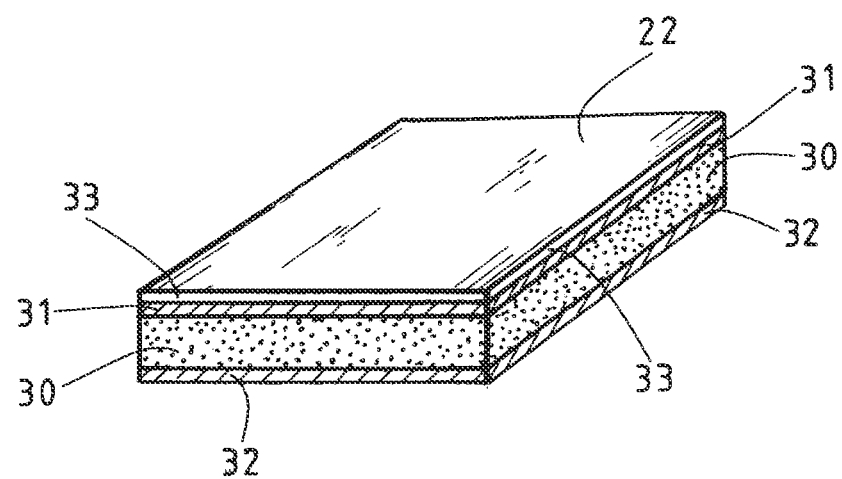
FIG. 3 is a perspective section view of a bulkhead of a rotor blade according to the invention.

FIG. 3 shows a perspective view of the principle construction of a bulkhead 22 according to the invention in a schematic partial view. The bulkhead 22 has a porous core body 30, which is produced in particular as a foam core body made of a plastic foam or a metal foam or from balsa wood. FGRP layers 31, 32, i.e. layers with fiberglass-reinforced plastic, are applied on the top and bottom side of the core body 30 respectively, and connected with the surface of the core body 30 respectively under formation of an adhesive bond.

A non-rusting sheet-metal part 33 in the form of a metal layer body is arranged on the topside FGRP layer 31, wherein the sheet-metal part 33 completely covers the upper FGRP layer 31.

It is possible in one embodiment that several sheet-metal parts 33 are arranged in multiple parts, e.g. segmented, on the upper FGRP layer 31 arranged towards the inside of a rotor blade, wherein the sheet-metal part(s) 33 are glued together with the topside FGRP layer 31. Moreover, it is possible in a further embodiment that the sheet-metal part 33 is connected with the upper FGRP layer 31 using rivets or other fastening means.

In particular, the sheet-metal part 33 is designed as a stainless-steel, sheet-metal part or as an aluminum sheet, whereby the top side of the bulkhead 22 is correspondingly covered.

Through the principle construction of the bulkhead 22 for a rotor blade or respectively for a rotor blade connection shown in FIG. 3, a component for the rotor blade root is provided, which is very easy to handle and is thereby arranged or fastened in a simple manner in a rotor blade root of a rotor blade.

The multi-layer or respectively four-layer bulkhead according to the invention is further characterized by a high stability and a low weight. Through the arrangement of the sheet-metal part 33 towards the inside of the rotor blade, the bulkhead is also effectively protected from erosion by particles from inside the rotor blade.

All named characteristics, including those taken from the drawings alone, and individual characteristics, which are disclosed in combination with other characteristics, are considered alone and in combination as important to the invention. Embodiments according to the invention can be fulfilled through individual characteristics or a combination of several characteristics.

LIST OF REFERENCES

9 Rotor hub
10 Wind turbine
11 Tower
12 Rotor
14 Rotor blade
16 Rotor blade root
18 Pressure side
20 Trailing edge
22 Bulkhead
24 Access opening
30 Core body
31 FGRP layer
32 FGRP layer
33 Sheet-metal part
M Centre point

The invention claimed is:

1. A rotor blade (14) of a wind turbine (10), the rotor blade (14) comprising:
   a rotor blade root (16); and
   a bulkhead (22) that is arranged in the rotor blade in an area of the rotor blade root (16), the bulkhead (22) including
   a core body (30), wherein the core body (30) is made of balsa wood,
   a plurality of layers (31, 32) of fiberglass-reinforced plastic, wherein the layers (31, 32) are arranged on the core body (30) so that the core body (30) is between the layers (31, 32), respectively, and
   a metal layer body (33) is arranged on one side of one of the layers (31) of fiberglass-reinforced plastic, wherein the metal layer body (33) is arranged towards an inside of the rotor blade (14) so as to protect the bulkhead (22) from erosion by particles that are from the inside of the rotor blade (14), wherein the metal layer body (33) is connected with the layer (31) of fiberglass-reinforced plastic by screws or rivets.

2. The rotor blade (14) according to claim 1, wherein the layers (31, 32) of fiberglass-reinforced plastic are made of non-woven fabrics.

3. The rotor blade (14) according to claim 1, wherein the bulkhead (22) includes one or more access openings, and wherein the access openings are formed in a closable manner.

4. The rotor blade (14) according to claim 1, wherein the core body (30) has a thickness between 15 mm and 35 mm, and the layers (31, 32) of fiberglass-reinforced plastic (FGRP) have a thickness between 1 mm and 5 mm respectively and the metal layer body (33) has a thickness between 0.1 mm and 0.8 mm.

5. The rotor blade (14) according to claim 1, wherein the metal layer body (33) is made of a non-rusting metal.

6. The rotor blade (14) according to claim 5, wherein the metal layer body (33) is made of stainless steel or aluminium.

7. The rotor blade (14) according to claim 4, wherein the core body (30) has a thickness between 20 mm and 30 mm.

8. The rotor blade (14) according to claim 4, wherein the layers (31, 32) of fiberglass-reinforced plastic (FGRP) have a thickness between 2 mm to 4 mm.

9. The rotor blade (14) according to claim 4, wherein the metal layer body (33) has a thickness between 0.2 to 0.5 mm.

* * * * *